United States Patent [19]

Mueller-Hess et al.

[11] Patent Number: 5,134,053
[45] Date of Patent: Jul. 28, 1992

[54] GRAFT POLYMER WITH UNSATURATED LATERAL CHAINS, PHOTOSENSITIVE MIXTURE CONTAINING SAID GRAFT POLYMER AND RECORDING MATERIAL PRODUCED THEREFROM

[75] Inventors: Waltraud Mueller-Hess, Wiesbaden; Dieter Mohr, Budenheim; Matthias Kroggel, Kelkheim, all of Fed. Rep. of Germany

[73] Assignee: Hoechst Aktiengesellschaft, Frankfurt am Main, Fed. Rep. of Germany

[21] Appl. No.: 558,477

[22] Filed: Jul. 27, 1990

[30] Foreign Application Priority Data

Jul. 27, 1989 [DE] Fed. Rep. of Germany ....... 3924811

[51] Int. Cl.$^5$ .................. C08F 2/46; C08F 283/04; G03C 1/52
[52] U.S. Cl. ................................ 430/176; 522/90; 522/96; 522/149; 525/455; 525/456; 525/912
[58] Field of Search ............... 522/90, 96, 149; 430/176; 525/455, 456, 912

[56] References Cited

U.S. PATENT DOCUMENTS

| 2,929,710 | 3/1960 | Martin | 96/115 |
|---|---|---|---|
| 2,929,710 | 3/1960 | Martin | 96/115 |
| 3,144,905 | 11/1985 | Schulz et al. | 430/285 |
| 3,427,161 | 2/1969 | Laridon et al. | 96/35.1 |
| 3,877,939 | 4/1975 | Okai | 96/36.3 |
| 4,247,624 | 1/1981 | Foss | 430/281 |
| 4,301,231 | 11/1981 | Atarashi et al. | 522/149 |
| 4,492,748 | 1/1985 | Lutz et al. | 430/176 |
| 4,517,277 | 5/1985 | Lynch et al. | 430/281 |
| 4,521,546 | 6/1985 | O'Connor et al. | 525/455 |
| 4,548,894 | 10/1985 | Lynch et al. | 430/273 |
| 4,806,449 | 2/1989 | Hofmann et al. | 430/281 |
| 4,806,450 | 2/1989 | Hofmann et al. | 430/281 |
| 4,877,711 | 10/1989 | Aoai et al. | 430/176 |
| 4,891,300 | 1/1990 | Ichimura et al. | 522/149 |
| 5,026,771 | 6/1991 | Dupont et al. | 525/455 |
| 5,034,475 | 7/1991 | Kroggel et al. | 525/455 |

FOREIGN PATENT DOCUMENTS

| 0374376 | 6/1990 | European Pat. Off. . |
| 3732089 | 4/1989 | Fed. Rep. of Germany . |
| 62-246047 | 10/1987 | Japan . |
| 834337 | 5/1960 | United Kingdom . |

Primary Examiner—Marion E. McCamish
Assistant Examiner—Susan Berman
Attorney, Agent, or Firm—Foley & Lardner

[57] ABSTRACT

Disclosed is a photocurable mixture which is suited for the production of printing plates, in particular planographic printing plates, and photoresists. The mixture comprises a graft polymer comprised of a polyurethane as the graft backbone and grafted-on chains containing vinyl alcohol units and units with lateral, polymerizable or crosslinkable double bonds, and a photosensitive compound, such as a photoinitiator or a negative-working diazo compound.

The printing plates prepared from the mixture are distinguished by high photospeed, good developability with aqueous solutions and long print runs.

18 Claims, No Drawings

GRAFT POLYMER WITH UNSATURATED LATERAL CHAINS, PHOTOSENSITIVE MIXTURE CONTAINING SAID GRAFT POLYMER AND RECORDING MATERIAL PRODUCED THEREFROM

BACKGROUND OF THE INVENTION

The instant invention relates to a graft polymer with ethylenically unsaturated, polymerizable or crosslinkable lateral chains and to a photocurable mixture which can be developed with aqueous solutions and in which said graft polymer and a photosensitive substance are contained. The mixture is suited for the production of photosensitive recording materials, in particular of planographic printing plates and photoresists.

From U.S. Pat. No. 2,929,710, GB-A 834,337 and DE-A 15 22 359, the use of polyvinyl alcohol derivatives with lateral polymerizable double bonds in photopolymerizable mixtures is known. These derivatives of polyvinyl alcohol with polymerizable groups are, for example, unsaturated polyvinyl acetals or unsaturated polyvinyl esters. Due to their relatively high content of impurities, the polyvinyl alcohol derivatives described in the above publications are suited for use in photopolymerizable recording materials to a limited extent only. Moreover, the vinyl alcohol units have been reacted to such an extent that organic solvents are required for developing the imagewise exposed layers, and hence these layers do not meet to-date demands.

Polyvinyl alcohol derivatives containing just a small proportion of reacted vinyl alcohol units are used for the printing plates in accordance with GB-A 834,337, U.S. Pat. No. 3,877,939, U.S. Pat. No. 4,247,624, DE-A 31 28 949, DE-A 31 44 905 and DE-A 33 22 994, which can be developed with aqueous solutions. The printing forms are relatively brittle and thus give low print runs. The hydrophilic properties of the binders, which are required to achieve developability with aqueous media, are maintained even after the crosslinking reaction. This leads to swelling during development and to poor stability during the subsequent rinsing step. In most cases, it is very difficult to reproduce fine image elements with these recording materials.

The known recording materials, which can be developed with aqueous solutions, furthermore tend to the formation of residual layers during development, i.e., those portions of the recording layer, which have not been polymerized or crosslinked upon imagewise exposure, cannot be removed completely from the support, and layer residues are left behind. This phenomenon, which is in particular observed when metallic supports are used for the photocurable recording layer, is of disadvantage above all in the production of resist patterns and planographic printing plates.

EP-A 0,248,424 and EP-A 0,248,395 disclose photopolymerizable recording materials which can be washed out with aqueous-alkaline developer solutions and are suitable for producing printing plates. The binders contained in these materials are carboxyl-containing copolymers where COOH groups have been reacted by esterification with glycidyl (meth)acrylate. This modification results, on the one hand, in a reduction of the acid number of the binder, which renders the plate less easily developable, and, on the other hand, in a reduced glass transition temperature of the binder, which negatively affects the print run.

In DE-A 37 32 089 graft polymers are described, which comprise a polyurethane as the graft backbone and grafted-on vinyl ester units, which are at least partially saponified to give vinyl alcohol units. The polymers are suitable as binders for pigments; for preparing printing inks, thermoplastic adhesives and solvent-containing adhesives; as constituents of varnishes or coatings for fibers, films and metals, and for thermoplastic shaped articles.

Prior German Patent Application P 38 35 840.9 describes graft polymers which are obtained from graft polymers described in DE-A 37 32 089 by acetalization with saturated aliphatic or aromatic aldehydes.

Prior German Patent Application P 39 20 229.1 describes photopolymerizable mixtures in which the graft polyvinyl acetals described in P 38 35 840.9 are contained as binders.

SUMMARY OF THE INVENTION

It is an object of the present invention to provide polymers, which are polymerizable or crosslinkable upon exposure in the presence of photoinitiators, and photocurable mixtures suited for the production of printing plates, in particular planographic printing plates, and photoresists, which after imagewise exposure can be developed with water or aqueous solutions and which in the exposed state are highly resistant to aqueous processing solutions. Furthermore, the mixtures and the corresponding recording materials should be easy to prepare, possess a higher photospeed than known materials of analogous composition and give images of high resolution and long print runs.

In accordance with this invention, a graft polymer is provided which is comprised of a polyurethane graft backbone and grafted-on chains containing units of vinyl alcohol and units having lateral polymerizable or crosslinkable double bonds.

In accordance with this invention, there is furthermore provided a photocurable mixture which contains, as essential constituents, a polymer with ethylenically unsaturated polymerizable or crosslinkable lateral chains and a photosensitive substance, wherein the polymer is a graft polymer of the above composition.

In accordance with the instant invention, there is also provided a photocurable recording material comprised of a layer support and a photosensitive recording layer, which is characterized in that said layer comprises a mixture of the above composition.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

The graft polymers of the instant invention are novel. For preparing them, a carboxylic acid vinyl ester and optionally another ethylenically unsaturated compound copolymerizable therewith is grafted onto a polyurethane graft backbone and thereafter saponified completely or partially. The polymers having vinyl alcohol units obtained in this way, which are known from DE-A 37 32 089, are further reacted with activated compounds possessing polymerizable double bonds, to give the compounds according to this invention. Prior to or following the introduction of the unsaturated groups, the polymer can be acetalized or acylated with saturated aliphatic or aromatic aldehydes or carboxylic acids.

The graft backbones consist of polyurethanes having at least two urethane groups in the molecule, the number of urethane groups per molecule being subject to no particular upper limit and in general having values higher than 2.

The polyurethanes employed as graft backbone can be produced from diols and diisocyanates by conventional processes of polyurethane synthesis. Cycloaliphatic diols, such as cyclohexanediols, and in particular aliphatic diols having 2 to 12 carbon atoms are preferred. Polyetherdiols, for example polypropylene oxides, polybutylene oxides and copolymers of ethylene oxide, propylene oxide and butylene oxide, preferably the block copolymers thereof, or poly-1,4-butanediols are also preferred; polyethylene oxides, especially those with molecular weights of between about 200 and 10,000, and more particularly of between about 400 and 1,500, are preferred. The polyetherdiols are advantageously employed in combination with low-molecular aliphatic diols, for example 1,4-butanediol, 1,3-propanediol, ethylene glycol, diethylene glycol, 1,2-hexanediol, 1,2-propanediol, pentanediol or cyclohexanediol. The molar ratio of polyetherdiol to low-molecular aliphatic diol is preferably from about 1:0.1 to 1:0.7.

Diisocyanate components which can be employed are aromatic diisocyanates. Aliphatic and/or cycloaliphatic diisocyanates are preferred. Preferred aliphatic diisocyanates are those having 2 to 12 carbon atoms in the aliphatic radical, for example ethylene diisocyanate, propylene diisocyanate, tetramethylene diisocyanate and 2,2,4-trimethylhexamethylene diisocyanate. Preferred cycloaliphatic diisocyanates are, for example, 1,4-diisocyanato-cyclohexane, dicyclohexylmethane-4,4'-diisocyanate and isophorone diisocyanate. Hexamethylene diisocyanate and isophorone diisocyanate are particularly preferred.

The molar ratio of diol component to diisocyanate component is preferably between about 1:0.99 and 1:0.5, in particular between about 1:0.98 and 1:0.7. The average molecular weights of the polyurethanes are preferably between about 200 and 100,000, in particular between about 1,000 and 50,000 and particularly preferentially between about 3,000 and 25,000.

Carboxylic acid vinyl esters having 3 to 20 and preferably 4 to 14 carbon atoms are employed for grafting onto the polyurethane. Vinyl acetate and/or vinyl propionate, in particular vinyl acetate, are particularly preferred. Mixtures of vinyl acetate and/or vinyl propionate and vinyl versatate are also preferred. In particular in the case of partial or complete saponification of the products following the graft polymerization, the co-use of vinyl propionate in addition to vinyl acetate during grafting is advantageous. Moreover, copolymerizable mixtures of carboxylic acid vinyl esters can be grafted, preferably mixtures of vinyl acetate and minor amounts of vinyl versatate.

Grafting with different carboxylic acid vinyl esters in the form of block copolymers can also be advantageous. Furthermore, the carboxylic acid vinyl esters can also be grafted together with other ethylenically unsaturated and copolymerizable monomers, in particular acids, such as maleic acid, itaconic acid, mesaconic acid, crotonic acid, acrylic acid or the esters thereof.

The proportion of the grafted-on components is in general about 10 to 95, preferably about 30 to 90 and in particular about 40 to 80 % by weight, based on the total graft polymer.

The graft polymers obtained can be saponified by hydrolysis, alcoholysis or transesterification, the degree of hydrolysis being at least about 30 mol %, preferably about 45 to 99 mol %, based on the mole number of saponifiable monomer units in the graft polymer. The production of the graft polymers with a polyurethane graft backbone and their saponification are described in DE-A 37 32 089, which is incorporated herein by reference.

The polymerizable lateral groups can be introduced by reacting the free OH groups of the graft polymer in any desired known manner. It has been found that those polymers are particularly well suited for the purposes of the instant invention where the unsaturated lateral groups have been introduced by esterification, etherification or urethane-formation. The reactions can be performed in a homogeneous phase or in a heterogeneous phase.

Polymers with olefinically unsaturated lateral groups being linked via ether bonds are, for example, obtained by etherifying the OH groups with hydroxyl-containing derivatives of $\alpha,\beta$-unsaturated carboxylic acids, such as N-methy-lol(meth)acrylamide, N-(3-hydroxy-2,2-dimethylpropyl)-(meth)acrylamide, N-(2,2,2-trichloro 1-hydroxyethyl)-(meth)acrylamide or hydroxyalkyl(meth)acrylates, e.g. $\beta$-hydroxyethyl-(meth)acrylate or $\beta$-hydroxypropyl-(meth)acrylate.

A typical etherification reaction in a homogeneous phase is performed as follows: The vinyl alcohol unit-containing polymer is taken up in a solvent. Depending on the type of polymer used, preferred solvents are, for example, N-methylpyrrolidone or butanone. The solution preferably has a solids content of 5 to 50%. The derivative of the $\alpha,\beta$-unsaturated carboxylic acid, a catalyst (e.g., phosphoric acid) and if appropriate an inhibitor of thermal polymerization are sequentially added to this solution. The reaction time is 5 to 48 hours at temperatures between 30° C. and 140° C. In a heterogeneous phase, the reaction is conducted in the same way. Care should, however, be taken to make sure that the graft polymer is finely distributed.

The etherification can also be performed with compounds containing oxirane rings, for example, glycidyl (meth)acrylate. The catalysts used for this reaction preferably are basic compounds, such as trialkylamines, basic aluminum oxide, dimethylaminopyridine, N-methylimidazole, tetrabutylammonium iodide, and the like. The reaction is performed at temperatures of 20° to 120° C. within 2 to 40 hours.

For the linking of the polymerizable lateral groups by urethane formation isocyanate group-containing derivatives of $\alpha$-$\beta$-unsaturated carboxylic acids, such as isocyanatoalkyl (meth)acrylates, are preferably employed. The reaction is conducted in solution or dispersion, with a solids content of 5 to 50%. The derivative of the $\alpha,\beta$-unsaturated carboxylic acid, a thermal polymerization inhibitor and a suitable catalyst, e.g. dibutyl tin dilaurate or simple basic compounds, are added to the solution or dispersion, and the mixture is heated to 20° to 100° C. for 2 to 40 hours.

The most frequent way to introduce the polymerizable double bonds into the polymer is by esterification. Preferred reaction partners of the vinyl alcohol polymers are anhydrides or halides of $\alpha,\beta$-unsaturated carboxylic acids having 3 to 10 carbon atoms, particularly 3 or 4 carbon atoms, such as (meth)acrylic acid anhydride, crotonic acid anhydride, maleic anhydride or (meth)acrylic acid chloride, whereby radicals having terminal double bonds are preferred. Tertiary amines are expediently used as esterification catalysts. Lower aliphatic ketones, hydrocarbons, five- or six-member-ring lactones or five- or six-member-ring lactams or ethers are used as solvents or dispersants. The reaction is in general carried out at a temperature between 0° and 120° C. for about 2 to 40 hours.

In general, the polymers according to the present invention contain about 1 to 60 mole %, preferably about 2 to 40 mole % of units possessing olefinically unsaturated, polymerizable or crosslinkable double bonds; 0 to about 85 mole %, preferably about 0 to 70 mole %, of vinyl acetal units; 0 to about 45 mole %, preferably about 1 to 25 mole %, of vinyl ester units of saturated aliphatic or aromatic carboxylic acids; and about 5 to 97 mole %, preferably about 10 to 90 mole %, of vinyl alcohol units.

The mole percentages indicated above are each time related to the content of the polymer of grafted-on units.

The acetal groups can be incorporated into the polymer prior to or following the introduction of the radicals possessing polymerizable double bonds.

Aliphatic aldehydes having 1 to 20 carbon atoms, which may be substituted, and aromatic aldehydes, which may also be substituted, are employed for acetalizing. Preference is given to aliphatic aldehydes having 1 to 5 carbon atoms, such as n-butyraldehyde, isobutyraldehyde, propionaldehyde or formaldehyde. Substituted or unsubstituted benzaldehydes, such as benzaldehyde, p-chlorobenzaldehyde or p-methoxy-benzaldehyde are also suited. It is also possible to employ combinations of several of these aldehydes.

The hydroxyl number of the finished crosslinkable polymer should be in the range of about 100 to 600, preferably of about 200 to 500.

The acetalization can be performed employing two different methods:

In accordance with the first process variant, the graft polymer is dissolved or dispersed in an alcohol or in a water/alcohol mixture, mixed with a catalytic amount of an organic or inorganic acid and an aldehyde or aldehyde mixture, and heated. The polymer can be precipitated and purified by dropwise adding the reaction mixture to a non-solvent.

In accordance with the second process variant, the graft polymer is dissolved in water and mixed with an aldehyde or aldehyde mixture. Subsequently, an aqueous solution of an inorganic or strong organic acid is added dropwise at a low temperature. Thereby, the acetalized graft polymer is often precipitated. The reaction is completed at an elevated temperature of about 20° to 60° C. The isolated polymer is purified by washing with water or re-precipitation.

The acetalization can also be performed in organic solvents. Suitable solvents include water-miscible solvents, in particular water-soluble alcohols, such as ethanol and/or methanol, to which water may be added.

Preferred acid catalysts are organic sulfonic acids, for example, toluene sulfonic acids, and also mineral acids, for example sulfuric acid, phosphoric acid, hydrochloric acid or optionally nitric acid. Among these, perference is given to phosphoric acid and hydrochloric acid.

The conversion of the graft polyvinyl alcohols into graft polyvinyl acetals has been described in detail in the prior German Patent Applications P 38 35 840.9 and P 39 20 229.1, which are incorporated by reference herein.

Other saturated lateral chains can be additionally introduced into the polymer. Appropriate radicals without olefinic unsaturation can be introduced without problem by etherification or transesterification. Polymers with lateral chains containing free carboxyl radicals can, for example, be prepared by acylating the vinyl alcohol units with activated derivatives of di- or polybasic carboxylic acids, such as succinic acid anhydride or phthalic acid anhydride, with formation of the partial esters of these polybasic acids. Groups imparting solubility in alkaline media can also be incorporated by reacting OH groups of the polymer with sulfonyl isocyanates, employing known methods. Reactions of this type can be run simultaneously with the introduction of olefinically unsaturated groups or in a separate step.

In combination with photoinitiators and optionally with additional negative-working substances, the polymers according to this invention give photosensitive mixtures, which can be used for numerous applications, in particular for producing planographic printing plates, screen printing stencils and photoresists.

In general, the photosensitive mixtures contain about 20 to 95, preferably about 25 to 80,% by weight of crosslinkable polymeric binder, relative to the weight of all non-volatile constituents of the mixture. Up to about 80% by weight, preferably up to about 40% by weight, of the total amount of binder can be replaced by any of a great number of customary saturated binders. Examples of suitable compounds are: polyamides, polyvinyl esters, polyvinyl acetals, polyvinyl ethers, epoxide resins, polyacrylic acid esters, polymethacrylic acid esters, polyesters, alkyd resins, polyacryl amides, polyvinyl alcohols, polyethylene oxides, polydimethylacrylamide, polyvinylpyrrolidone, polyvinylmethylformamide, polyvinylmethylacetamide, and copolymers of the monomers forming the homopolymers enumerated.

Advantageously, these binders, too, are water-insoluble but soluble or at least swellable in aqueous-alkaline solutions. Examples of polymers of this generic type include: maleate resins, polymers of $\beta$-(methacryloyloxy)-ethyl N-(P-tolylsulfonyl)carbamate and copolymers of these and similar monomers with other monomers, as well as vinyl acetate/crotonic acid copolymers, styrene/maleic anhydride copolymers, alkyl methacrylate/methacrylic acid copolymers and copolymers of methacrylic acid, higher alkyl methacrylates and methyl methacrylate and/or styrene, acrylonitrile and others.

Apart from the polymers according to this invention, the mixtures of the invention contain at least one photosensitive substance, by which the polymerization or crosslinking of the unsaturated groups is induced upon the action of actinic light. In the simplest case this substance is a photoinitiator or photoinitiator combination.

A large number of substances can be used as photoinitiators. Examples include benzoins; benzoin ethers; polynuclear quinones, such as 2-ethyl-anthraquinone; acridine derivatives, such as 9-phenylacridine or benzacridine; phenazine derivatives, such as 9,10-dimethylbenz-(a)phenazine; quinoxaline derivatives or quinoline derivatives, such as 2,3-bis-(4-methoxyphenyl)quinoxaline or 2-styrylquinoline; quinazoline compounds; or acylphosphineoxide compounds. Photoinitiators of this type are described in DE-C 20 27 467, DE-C 20 39 861, DE-A 37 28 168, EP-B 0,011,786 and EP-A 0,220,589. Hydrazones, mercapto compounds, pyrylium salts or thiopyrylium salts, xanthones, thioxanthones, benzoquinones, acetophenones, benzophenones, synergistic mixtures with ketones or hydroxy ketones and dyestuff redox systems may also be used. Particular preference is given to photoinitiators possessing photo-cleavable trihalomethyl groups, especially to corresponding compounds of the triazine or thiazoline series. Compounds of this type are described in DE-A 27 18 259, DE-A 33 33 450 and DE-A 33 37 024. 2-(4-Methoxystyryl)-4,6-bis-trichloro-methyl-s-triazine is a preferred example. It is advantageous to combine these compounds with photooxidizable dyes, photoreducible compounds and optionally further coinitiators, as is described, for example, in EP-A 0,284,939 and EP-A 0,287,817.

The photoinitiators are generally employed in a quantity from about 0.01 to 15, and preferably from about 0.1 to 10, % by weight, relative to the non-volatile constituents of the mixture.

In addition, the mixtures and materials according to the invention preferably contain a free-radically polymerizable, preferably low molecular weight, compound with at least one terminal ethylenic double bond. Preferably, esters of acrylic or methacrylic acid with mono- or polyhydric, preferably primary, alcohols are used as the polymerizable compounds. Preferably, the polymerizable compounds should possess more than one, in particular 2 to 4, polymerizable groups. Examples of suitable polyhydric alcohols are ethylene glycol, propylene glycol, butane-1,4-diol, butane-1,3-diol, diethylene glycol, triethylene glycol or polyethylene glycols or polypropylene glycols with molecular weights from about 200 to 1,000, neopentyl glycol, glycerol, trimethylolethane, trimethylolpropane, pentaerythritol, bisphenol-A derivatives and reaction products of these compounds with ethylene oxide and/or propylene oxide. Bis-acrylates and bis-methacrylates which contain urethane groups and which are obtained by the reaction of 1 mole of a diisocyanate with 2 moles of a hydroxyalkyl acrylate or hydroxyalkyl methacrylate are particularly suited. The diisocyanate may also be an oligomeric product obtained by the reaction of a diol with a molar excess of a monomeric diisocyanate. These and similar monomers containing urethane groups are described in DE-A 20 64 079, DE-A-28 22 190, DE-A-30 48 502 and DE-A-35 40 480. In addition to the esters mentioned above, amides of acrylic or methacrylic acid can be employed. Examples are methylene-bis-(meth)acrylamide and m-xylylene-bis-(meth)acrylamide.

The amount of monomers contained in the mixture generally is about 10 to 80% by weight, preferably 20 to 60% by weight, of the non-volatile constituents.

Instead of or in addition to the photoinitiators, photocurable diazo compounds or azido compounds can be contained in the mixtures as photosensitive compounds. Preference is given to diazonium salt polycondensation products which are obtained by condensation of aromatic diazonium salts with active carbonyl compounds, in particular formaldehyde.

It is particularly advantageous to use cocondensation products containing, in addition to the diazonium salt units A—N$_2$X, other, non-photosensitive units B which are derived from condensible compounds, particularly from aromatic amines, phenols, phenol ethers, aromatic thioethers, aromatic hydrocarbons, aromatic heterocyclic compounds and organic acid amines. These condensation products are described in DE-A 20 24 244. Generally, all diazonium salt polycondenstion products described in DE-A 27 39 774 are suitable.

The diazonium salt units A—N$_2$X are preferably derived from compounds corresponding to the formula $(R^1—R^2—)_pR^3—N_2X$, in which
X is the anion of the diazonium compound,
p is an integer from 1 to 3,
$R^1$ is an aromatic radical which is capable, in at least one position, of condensation with an active carbonyl compound,
$R^3$ is an arylene group, preferably a phenylene group which may be substituted,
$R^2$ is a single bond or one of the groups:
—(CH$_2$)$_q$—NR$^4$—,
—O—(CH$_2$)$_r$—NR$^4$—,
—S—(CH$_2$)$_r$—NR$^4$—,
—S—CH$_2$CO—NR$^4$—,
—O—R$^5$—O—,
—O—,
—S—, or
—CO—NR$^4$—,
where
q is a number from 0 to 5,
r is a number from 2 to 5,
$R^4$ is a hydrogen atom, an alkyl group having from 1 to 5 carbon atoms, an aralkyl group having from 7 to 12 carbon atoms or an aryl group having from 6 to 12 carbon atoms, and
$R^5$ is an arylene group having from 6 to 12 carbon atoms.

Further advantageous polycondensation products are obtained by condensing an optionally substituted diphenylamine diazonium salt first with an aromatic compound R'—O—CH$_2$—B and then with an aromatic compound R'—O—CH$_2$—B—CH$_2$—O—R', R' denoting a hydrogen atom, an alkyl radical or an aliphatic acyl radical, and B denoting the radical of any one of the condensible compounds listed above. These condensation products are described in detail in EP-A 126,875.

The diazonium salt polycondensation products are contained in the mixture in an amount of about 0 to 60% by weight, preferably of about 10 to 40% by weight, relative to the non-volatile constituents of the mixture.

The exclusive addition of diazonium salt polycondensation products to the polymers according to this invention does not result in preferred mixtures. It is, however, advantageous to employ mixtures which additionally contain photoinitiators of the type described above. Preferably, the mixtures also contain low molecular-weight polymerizable compounds of the type described above.

Depending on their intended use and desired properties, the photosensitive mixtures can comprise further substances as admixtures. Examples thereof include: inhibitors which prevent thermal polymerization of the monomers, hydrogen donors, dyes, colored and uncolored pigments, color formers, indicators, plasticizers, chain transfer agents, levelling agents, matting agents, slip agents, and acids to stabilize the diazonium salt polycondensates, preferably phosphoric acid.

Examples of suitable dyes and/or pigments include triphenyl-methane dyes, e.g. Brilliant Green Dye (C.I. 42,040), Victoria Pure Blue FGA, Victoria Pure Blue BO (C.I. 42,595), Malachite Green, Crystal Violet, Victoria Blue B (C.I. 44,045), Rhodamine 6 (C.I. 45,160), naphthalimide dyes, azosoles and 3'-phenyl-7-dimethylamino-2,2'-spiro-di(2H-1-benzopyran). Photochromic systems whose color changes reversibly or irreversibly upon exposure to actinic light, without the photopolymerization process being thereby affected, include, for example, leuco dyes together with suitable activators. The leuco bases of the triphenylmethane dyes, such as Crystal Violet, Malachite Green, Leuco Basic Blue, Leuco Pararosaniline, and Leuco Patent Blue A and V are examples of leuco dyes; Rhodamine B Base is also suited. Activators for these photochromic compounds include, inter alia, organic halogen compounds, which upon irradiation with actinic light split off halogen radicals, or hexaarylbisimidazoles. 9-Nitroanthracene, 10,10'-bis-anthrone, phenazinium dyes, phenoxazinium dyes, acridinium dyes or phenothiazinium dyes, in particular in combination with mild reducing agents, are examples of compounds which can be added as sensitometric regulators.

The additives and/or auxiliaries are present in the photosensitive mixtures in the customary effective amounts known for the respective substances. As a rule, their amount should not exceed about 30% by weight, preferably about 20% by weight, of the photopolymerizable recording layer.

The support material is coated from appropriate organic solvents or solvent mixtures, generally by flow-coating, spraying or dipping. The coating method depends on the desired layer thickness, the dried layers usually having thicknesses between about 0.5 and 200 $\mu$m.

Suitable supports are, for example, magnesium, zinc, copper, aluminum, steel, and also polyester film or cellulose acetate film, Perlon gauze etc., the surfaces of which may have been subjected to a pretreatment. The support material may function as the final support or as a temporary support material from which the photosensitive layer is transferred by lamination to the workpiece to be processed.

Employing the mixture according to the invention, it is not absolutely necessary to exclude the access of oxygen during exposure. Nevertheless, it is generally favorable to keep the mixture away from the influence of atmospheric oxygen during the photopolymerization. When the mixture is used in the form of thin copying layers, it is advisable to apply a suitable protective film which is substantially impermeable to oxygen. This film can be self-supporting and can then be peeled off before development of the copying layer. For this purpose, polyester films, for example, are suitable. The protective film can also comprise a material which dissolves in the developer liquid or can be removed during development, at least from the non-hardened areas. Materials which are suitable for this purpose are, for example, polyvinyl alcohol, vinyl alcohol/vinyl acetate copolymers, polyvinylpyrrolidone, vinylpyrrolidone/vinyl acetate copolymers, polyacrylic acid, butadiene/maleic acid copolymers, polyvinylmethyl ethers, polyphosphates, sugars etc.. Such protective layers generally have a thickness of about 0.1 to 10 $\mu$m, preferably of about 0.5 to 5 $\mu$m.

The recording material which is prepared using the photopolymerizable mixtures of the invention serves, on the one hand, to produce images on suitable supports or receptor sheets and, on the other hand, to produce reliefs which are used as printing plates, screens, resists, and the like.

In addition, it is also possible to use the photosensitive mixtures for the formulation of UV-hardenable printing inks or for the preparation of lacquers which are hardenable by ultraviolet radiation and may be used for the protection of surfaces.

Preferably, the mixtures are used for the production of lithographic printing plates, where aluminum is the preferred support material. It is particularly preferred to pretreat the aluminum used for this purpose in the usual manner, for example, by a mechanical, chemical or electrochemical graining process which is, optionally, followed by an anodic oxidation. A further treatment of this support material, for example, with polyvinyl phosphonic acid, alkali metal silicate, phosphate, hexafluorozirconate, chromate, borate, polyacrylamide and cellulose derivatives is advantageous.

The recording materials obtained from the mixtures are processed in the conventional manner, by exposing them imagewise and washing-out the unexposed areas of the layers with a suitable developer.

The recording material is exposed under an original, as is known in the art, using light sources which emit light with the highest possible spectral fraction in the near ultraviolet region. The material can also be exposed by laser irradiation. Suitable lasers for irradiation are shorterwave lasers of adequate performance, for example, Ar lasers, krypton ion lasers, helium/cadmium lasers, emitting in the region between about 300 and 600 nm and, for some layers, even $CO_2$ lasers, which emit at about 10.6 $\mu$m, or YAG lasers emitting at about 1.06 $\mu$m.

As the developer solutions, neutral or preferably alkaline aqueous solutions are used, which have a pH value in the range from 8 to 14, preferably from 8.5 to 13, and which contain buffer salts, for example, water-soluble alkali metal phosphates, alkali metal silicates, alkali metal borates, alkali metal carbonates, alkali metal acetates or alkali metal benzoates. Additional constituents used are wetting agents, preferably anionic wetting agents and, if appropriate, water-soluble polymers. The solution can also contain minor amounts, for example, up to 5 percent by weight, preferably not more than 2 percent by weight, of water-miscible organic solvents. It is preferred to use difficultly volatile solvents, for example, araliphatic alcohols, the vapor pressure of which is of no consequence in the handling of the developer. Development can be performed in the conventional manner by dipping, spraying, brushing or wiping-over with a pad. If desired, the developed material can be treated with a gumming solution.

The print runs can be increased by post-heating the exposed plates or by post-exposing the developed plates. The two process steps can also be combined. But even without an additional heat-treatment or post-exposure, high print runs are achieved.

A thermal post-treatment is also a suitable means for additionally strengthening photosensitive layers containing diazonium salt polycondensation products. Such a treatment is particularly recommended for planographic printing forms. It comprises heating the gummed printing form to a temperature of between 180° C. and 240° C. The duration of the treatment depends on the temperature and generally is two to twenty minutes. With this thermal post-treatment no surfactant is required. It is assumed that the polymers having unsaturated side groups undergo an additional thermal crosslinking reaction. It may therefore be expedient to add a thermal crosslinking agent to the photosensitive mixture, such as, for example, an organic peroxide, which has a scorch temperature of at least 100° C. and above this temperature is capable of forming free radicals, as is described in EP-A 247,461. Examples of suitable peroxides include peroxy-esters, peroxyketals, bisaralkyl peroxides, dialkyl peroxides and bis-dialkyl peroxides. The ink acceptance of the photosensitive layers is substantially improved by this thermal post-treatment, in particular, if the polymers employed have high hydroxyl numbers.

The mixtures according to the invention and the recording materials obtained therefrom are sufficiently hydrophobic to guarantee good ink acceptance. In the exposed areas, virtually no swelling is observed during development. Compared to known photocrosslinkable polymers based on polyvinyl alcohol the polymers of this invention are distinguished by a reduced brittleness. This property is particularly pronounced in the case of those compounds whose polyurethane graft backbone contains ether groups, i.e., has been obtained with the co-use of polyether diols. This furthermore improves the solubility in aqueous developer solutions. The elasticity of the graft polymers according to the instant invention is additionally increased by the urethane groups contained in the graft backbone.

Due to the polymerizable double bonds in the polymer, the photosensitive layer is additionally hardened upon exposure; the increased strength of the exposed polymer layer in turn results in a longer print run. Furthermore, the photospeed is increased by the additional crosslinking.

The brittleness observed when the known photocrosslinkable polymers on a polyvinyl alcohol basis are employed is avoided, on the one hand, by a higher degree of modification of the polyvinyl alcohol graft polymers of the invention and, on the other hand, by the above-mentioned structural particularities of these graft polymers. Compared to customary polyvinyl alcohols, the melting temperatures of the polyvinyl alcohol derivatives grafted onto polyurethanes are substantially lower, and this considerably reduces the brittleness of the polymers as well. The melting points of the polymers can be varied within very wide ranges by appropriately adjusting the composition of the polyurethane graft backbone and the degree of saponification and the substitution of the OH groups formed.

The photosensitive recording materials according to this invention give printing plates which are distinguished by excellent reproduction properties and can be easily processed with non-polluting developer solutions without scum. The intermolecular crosslinking of the binder upon exposure causes an extreme molecular weight increase. This imparts additional hardness to the layer, which has a favorable effect on long print runs. The photospeed of the mixtures according to the invention is considerably increased, too. Printing plates without oxygen barrier layers are, in particular, distinguished by shorter exposure times than are required for comparable known printing plates.

The invention and its possible fields of application are illustrated in greater detail by the Examples below. Parts by weight (pbw) and parts by volume (pbv) bear the same relationship as g and cm³; unless otherwise specified, percentages and amounts are related to weight.

First, the preparation of the graft polymers used in the Examples is described.

a) Preparation of polyurethane graft backbones

In each case, the diol component and the catalyst were first introduced into a reaction vessel equipped with a stirrer and supplied with a nitrogen atmosphere, and the mixture was heated to a reaction temperature of between 65° C. and 100° C. Then the diisocyanate component was metered in whereby care was taken that the temperature of the reaction mixture did not exceed 120° C., and preferably did not exceed 100° C. After the complete addition of the diisocyanate component, the mixture was post-heated to a temperature between 80° C. and 100° C. for a period of up to two hours in order to complete the reaction. The completion of the conversion and thus the end of the reaction were determined by an analysis of the diisocyanate consumption with the aid of known methods (p.e., IR-spectroscopy, titration).

The detailed composition of the reaction mixtures used in the Examples and the calculated weight average molecular weights ($\overline{M}_{calc}$) of the resulting polyurethanes (PU) are compiled in Table 1 below. The molecular weights result from the molar ratio diol component/diisocyanate, assuming a complete conversion of the NCO groups.

TABLE 1

| Polyurethane (PU) | Diol component PEG/Bu (molar ratio) | Reaction tep. (°C.) | Molar ratio diol component-diisocyanate | $\overline{M}_{calc}$ |
|---|---|---|---|---|
| A | 7:3 | 80 | 1:0.9 | 6,470 |
| B | 7:3 | 72 | 1:0.9 | 6,470 |
| C | 3:2 | 78 | 1:0.97 | 18,300 |
| D | 7:3 | 75 | 1:0.97 | 19,900 |

PEG = polyethylene glycol, molecular weight 600
Bu = 1,4-butanediol

All products were prepared using isophorone diisocyanate as the diisocyanate component. In each case, 1,4-dimethylpiperazine was used as the catalyst in an amount of 0.48 mole %, relative to the diisocyanate.

b) Preparation of the graft polymers

In each case, the polyurethane graft backbone was melted in a reaction vessel in a nitrogen atmosphere or was dissolved, respectively, by adding small amounts of methanol, and heated to a temperature between 60° C. and 100° C. The monomers to be grafted on, which had optionally been dissolved in a solvent (e.g. methanol), including the free-radical initiator dissolved in the monomer, were then slowly metered to the polyurethane graft backbone, in a way such that the homopolymer formation was largely suppressed.

The maximum temperature of the reaction mixture should be 120° C., more preferably 100° C. When the post-reaction was completed, excess monomer remainders were removed by azeotropic distillation with methanol. The compositions of the individual reaction mixtures and the reaction parameters are compiled in Table 2 below.

TABLE 2

| Graft polymer | PU | VAc g/g PU | Start temp. °C. | Metering time min | Post-react. min | Grafted-on monom. wt % | $J_o$ ml/g | calc. molecular weight |
|---|---|---|---|---|---|---|---|---|
| AV | A | 4 | 75 | 420 | 45 | 79.8 | 21.9 | 31,300 |
| BV | B | 2.32 | 73 | 420 | 45 | 69.3 | 18.3 | 21,000 |
| CV | C | 3.16 | 75 | 300 | 45 | 74.7 | 26.3 | 72,500 |
| DV | D | 3.16 | 75 | 420 | 45 | 74.5 | 28.7 | 78.000 |

VAc = Vinyl acetate
$J_o$ = intrinsic viscosity

All products were prepared employing 0.2 mole % of dibenzoyl peroxide (relative to the monomer used in each case). The intrinsic viscosities were determined at 25° C. in tetrahydrofuran, using an Ostwald Viscosimeter, with the measured concentrations being selected such that a Hagenbach correction was not necessary. The grafted-on amount of monomer, in % by weight, is related to the weight of the total polymer.

Saponification of the graft polymers

The graft polymers of Table 2 were transesterified or saponified within two hours at room temperature. For this purpose, the products were dissolved in methanol to give 50% strength solutions and mixed with methanolic soda lye (10% strength). Depending on the added amount of alkali and the degree of grafting of the graft polymer, polymeric hydrolysis products having different degrees of hydrolysis were obtained. Partial saponification was performed with the addition of water. The resulting gels were granulated, the granules were washed with methanol (where appropriate with an addition of acetic acid to neutralize the soda lye) and dried. The process parameters and results are compiled in Table 3 below.

TABLE 3

| Graft poly-vinyl alcohol | Graft poly-vinyl acetate | mole % of NaOH per ester unit | mole % of H₂O per ester unit | Degree of hydrolysis in % | $\overline{M}_{calc}$ |
|---|---|---|---|---|---|
| E | AV | 1.92 | 0 | 98.2 | 22,000 |
| F | BV | 5.00 | 0 | 98.2 | 14,000 |
| G | CV | 1.92 | 0 | 98.2 | 47,000 |
| H | DV | 1.97 | 0 | 98.4 | 44,000 |
| I | CV | 1.93 | 42.9 | 86.8 | 50,000 |

Below, the preparation of unsaturated polymers according to this invention from the graft polyvinyl alcohols E to I is described. The polymers and their general preparation data are compiled in Table 4.

TABLE 4

| Unsaturated polymer | OH-group-containing polymer | Aldehyde | (Meth)acrylic acid derivative | % C=C |
|---|---|---|---|---|
| K | H | Bu | Methacryloyl chloride | 4.6 |
| L | G | Bu | Methacrylic acid anhydride | 2.1 |
| M | E | Bu | Glycidyl methacrylate | 2.4 |
| N | F | Pr | Isocyanatoethyl methacrylate | 3.7 |
| O | I | — | Methacrylic acid anhydride | 3.9 |
| P | G | — | Isocyanatoethyl methacrylate | 4.6 |
| Q | G | i-Bu | N-Methylol methacrylamide | 1.6 |
| R | H | Bu | Methacryloyl chloride | 3.4 |

TABLE 4-continued

| Unsaturated polymer | OH-group-containing polymer | Aldehyde | (Meth)acrylic acid derivative | % C=C |
|---|---|---|---|---|
| S | H | — | Hydroxyethyl methacrylate | 4.8 |
| T | E | Bu | Methacrylic acid anhydride | 1.8 X* |
| U | E | Bu | Glycidyl methacrylate | 1.7 X* |
| V | E | Bu | Methacrylic acid anhydride | 1.8 X** |
| W | G | Bu | Acryloyl chloride | 3.2 |
| X | H | Pr | Acrylic acid anhydride | 2.2 |

X* additionally reacted with phthalic acid anhydride
X** additionally reacted with propenylsulfonyl isocyanate

Polymer K 10 pbw of polymer H were dissolved in 80 pbw of N-methylpyrrolidone with heating. 0.02 pbw of hydroquinone monomethyl ether, 0.02 pbw of p-dimethylaminopyridine and 2.4 pbw of triethylamine were added to the solution at 30° C. Then 4.2 pbw of methacrylic acid chloride were dropwise added. The mixture was stirred for 8 hours at 50° C. and for another 24 hours at room temperature, then adjusted to a pH of 2 to 3 by means of concentrated hydrochloric acid, mixed with 3.6 pbw of n-butyraldehyde and stirred for 7 hours at 40° C. The polymer was precipitated by dropwise adding the reaction mixture to 5,000 pbw of distilled water, isolated by suction and dried. The polymer contained 4.6% by weight of C=C groups (weight of one C=C group: 24).

Polymer L 50 pbw of polymer G were finely ground and suspended in 150 ml of acetone. 12.5 pbw of methacrylic acid anhydride, 0.1 pbw of 2,6-di-tert.-butyl-4-methylphenol and 0.1 pbw of triethylamine were added to this mixture. The suspension was refluxed for 12 hours. Then the mixture was cooled down to room temperature, the polymer was isolated by suction, washed several times with acetone and dried. For the acetalization, 10 pbw of the polymer were dissolved in 70 pbw of N-methylpyrrolidone, and 0.04 pbw of 2,6-di-tert.-butyl-4-methylphenol and 3.46 pbw of n-butyraldehyde were added. 0.85 pbw of concentrated hydrochloric acid were added to the resulting solution, and the mixture was heated to 40° C. After 2 hours, another 2.1 pbw of concentrated hydrochloric acid were added, and stirring of the solution at 40° C. was continued for 2 hours. Then the reaction mixture was cooled down to room temperature, and the polymer was precipitated by pouring the mixture into 5,000 pbw of distilled water, isolated by suction and dried. The polymer contained 2.1% by weight of C=C groups.

Polymer M 20 pbw of polymer E were dissolved in 160 pbw of distilled water with slight heating. 5.8 pbw of N-butyraldehyde and 0.08 pbw of 2,6-di-tert.-butyl-4-methylphenol were added at room temperature. A solution comprising 0.16 pbw of sodium octyl sulfate, 2 pbw of concentrated hydrochloric acid and 24 pbw of water was dropwise stirred into this mixture. The mixture was stirred for 1 hour at room temperature, then heated to 40° C. and stirred for another 2 hours. 5.7 pbw of concentrated hydrochlorid acid were then added and stirring was continued at 40° C. for 2 more hours before the mixture was cooled down to room temperature. The aqueous phase was decanted from the precipitated polymer, the polymer was dissolved in ethanol, precipitated in 10,000 pbw of distilled water and dried in a vacuum drier until the weight remained constant. 10 pbw of the polymer prepared in this way were dissolved in 50 pbw of N-methylpyrrolidone and mixed with 2.2 pbw of glycidyl methacrylate, 5 pbw of aluminum oxide basic, and 10 drops of triethylamine. This solution was stirred for 48 hours at room temperature. After the filtering-off of the aluminum oxide the polymer was precipitated in water and dried. It contained 2.4% by weight of C=C groups.

Polymer N

Analogously to the preparation of polymer M, 20 pbw of polymer F were acetalized with 4.7 pbw of propionaldehyde. 10 pbw of the polymer obtained in this way were finely ground, suspended in 100 pbw of butanone and mixed with 3.9 pbw of isocyanatoethyl methacrylate and 2 drops of dibutyl tin dilaurate at room temperature. The resulting suspension was stirred for 5 hours at 60 ° C. and for 24 hours at room temperature. The polymer was isolated by suction and washed several times with butanone. It contained 3.7% by weight of C=C groups.

Polymer O 10 pbw of polymer I were dissolved in 75 pbw of N-methylpyrrolidone with slight heating. 0.2 pbw of 2,6-di-tert.-butyl-4-methylphenol, 0.05 pbw of p-dimethylamnno-pyridine, 3.25 pbw of methacrylic acid anhydride and 0.1 pbw of triethylamine were added to this solution, and the mixture was stirred for 8 hours at 50° C. Thereafter the mixture was cooled down to room temperature, and the polymer was precipitated in 5,000 pbw of distilled water, isolated by suction and dried. The polymer contained 3.9% by weight of C=C groups.

Polymer P 20 pbw of polymer G were finely ground and suspended in 100 pbw of butanone. 9.3 pbw of isocyanatoethyl methacrylate and 2 drops of dibutyl tin dilaurate were added and the mixture was stirred for 8 hours at 50 ° C. Then the mixture was cooled down to room temperature, and the polymer was isolated by suction and washed several times with butanone. It contained 4.6% by weight of C=C groups.

Polymer Q 10 pbw of polymer G were dissolved in 80 pbw of distilled water. 1.7 pbw of N-methylol methacrylamide and 0.1 pbw of 2,6-di-tert.-butyl-4-methylphenol were added at room temperature. The pH of the solution was adjusted to 3 with phosphoric acid (85% strength). The solution was heated to 60° C. for 20 hours. Then it was cooled down to room temperature, and 2.5 pbw of isobutyraldehyde and 0.08 pbw of sodium octyl sulfate were added. The resulting mixture was stirred for 4 hours at 40° C. After the aqueous solution had been decanted, the precipitated polymer was dissolved in ethanol and precipitated in 5,000 pbw of distilled water. It contained 1.6% by weight of C=C groups.

Polymer R 20 pbw of polymer H were dissolved in 150 pbw of N-methylpyrrolidone with heating. At room temperature, 0.4 pbw of 2,6-di-tert.-butyl-4-methylphenol and 0.1 pbw of p-dimethylaminopyridine were added, and 8.4. pbw of methacrylic acid chloride were added dropwise. 4.9 pbw of triethylamine were added to this solution, and the mixture was stirred for 8 hours and 50° C. and for 24 hours at room temperature. When the mixture had cooled down to room temperature, it was adjusted to a pH in the range of 2 to 3 by means of concentrated hydrochloric acid, 7.2 pbw of n-butyraldehyde were added, and the mixture was stirred for 7 hours at 60° C. The polymer was precipitated in distilled water, isolated by suction and dried. It contained 3.4% by weight of C=C groups.

Polymer S 10 pbw of polymer H were suspended in 100 pbw of butanone. 0.04 pbw of 2,6-di-tert.-butylcresol, 0.4 pbw of phosphoric acid (85% strength) and 5.21 pbw of hydroxyethyl methacrylate were added, and the resulting mixture was stirred for a total of 20 hours at 60° C. and for 30 hours at room temperature. The polymer was isolated by suction, washed several times with butanone and dried in a vacuum drier. It contained 4.8% by weight of C=C groups.

Polymer T 10 pbw of polymer E were acetalized with n-butyraldehyde in accordance with the preparation procedure of polymer M. The polymer was isolated by suction, dried, dissolved in 75 pbv of N-methylpyrrolidone and mixed with 2.8 pbw of methacrylic acid anhydride and 20 pbw of triethylamine. The solution was heated to 60° C. for 8 hours. Thereafter, 3.7 pbw of phthalic acid anhydride and 0.5 pbw of triethylamine were added at room temperature, and the resulting solution was stirred for 8 hours at 80° C. The polymer was precipitated in 5,000 pbw of water and dried in a drying cabinet. It contained 1.8% by weight of C=C groups and had an acid number of 75.

Polymer U 10 pbw of polymer E were acetalized with n-butyraldehyde in accordance with the preparation procedure of polymer M. The precipitated polymer was dissolved in ethanol, precipitated in 5,000 pbw of water, isolated by suction and dried. Then it was dissolved in 75 pbv of N-methylpyrrolidone, mixed with 0.3 pbw of triethylamine and 6.95 pbw of phthalic acid anhydride and stirred at 80° C. for 5 hours. After cooling the mixture to room-temperature, the polymer was precipitated in water and dried. The polymer was dissolved in 75 pbw of butanone and mixed with 0.2 pbw of 2,6-di-tert.-butylcresol, 0.05 pbw of dimethylaminopyridine and 1.0 pbw of triethylamine. 1.4 pbw of glycidyl methacrylate were added to the resulting mixture, and the mixture was stirred at room temperature for 48 hours. The polymer was precipitated in 5,000 pbw of water and then dried. It contained 1.7% by weight of C=C groups and had an acid number of 87.

Polymer V

In accordance with the preparation process of polymer T, polymer E was acetalized and provided with double bonds, except that propenyl sulfonyl isocyanate was used for the reaction instead of phthalic acid anhydride. For performing the reaction, 3.7 pbw of the sulfonyl isocyanate in 15 pbv of butanone were dropwise added to the solution in N-methylpyrrolidone. During the addition, the temperature of the mixture rose to 34° C. When the addition of the isocyanate solution was completed, 3 drops of dibutyl tin dilaurate were added, and the mixture was stirred at room temperature for 1 hour. The polymer was precipitated in 5,000 pbw of water and dried. It contained 1.8% by weight of C=C groups and had an acid number of 102.

Polymer W

In accordance with the preparation process of polymer R, unsaturated groups and acetal groups were introduced into polymer G, with the difference that acryloyl chloride (7.3 pbw) was used instead of methacryloyl chloride. The resulting product contained 3.2% by weight of C=C groups.

Polymer X

In accordance with the preparation process described for polymer L, polymer H was acylated and acetalized, except that 10.1 pbw of acrylic acid anhydride were used instead of methacrylic acid anhydride and 2.88 pbw of propionaldehyde were used instead of n-butyraldehyde. The product contained 2.2% by weight of C=C groups.

EXAMPLE 1

A coating solution comprised of
2.10 pbw of polymer K,
2.46 pbw of a technical-grade mixture of pentaerythritol triacrylate and pentaerythritol tetraacrylate,
0.01 pbw of phenylazodiphenylamine,
0.21 pbw of 2,4-bis-trichloromethyl-6-(4-styrylphenyl)-s-triazine, and
0.35 pbw of Renol Blue B2GH (C.I. 74,160), in
85.00 pbw of propylene glycol monomethyl ether
is applied to a 0.3 mm thick aluminum foil which has been electrochemically grained in nitric acid, anodically oxidized in sulfuric acid and post-treated with a 0.1% strength aqueous solution of polyvinyl phosphonic acid. Application is performed such that a dry layer weight of 1.6 g/m$^2$ results. The photosensitive layer obtained in this way is exposed for 17 seconds through a standard negative test original by means of a 5 kW metal halide lamp. The exposed layer exhibits a clear contrast between the exposed and unexposed areas and is developed with a developer solution having the following composition, by rubbing with a cotton pad:

5.0 pbw of sodium octyl sulfate,
1.5 pbw of sodium metasilicate×5 H$_2$O,
1.0 pbw of disodium hydrogen phosphate×12 H$_2$O and
92.5 pbw of distilled water.
The non-exposed layer areas are completely removed within 15 seconds. The plate is then rinsed with water. Step 4 of a silver film continuous tone stepwedge covering a density range of 0.05 to 3.05 and having density increments of 0.15 is reproduced solid on the copy. Even the finest screen elements and lines of the original are rendered.

When polymer W is employed in the coating solution instead of polymer K (same amount as polymer K), 4 solid steps are obtained on the copy after an exposure time of 25 seconds.

A printing plate prepared as described above is coated with a polyvinyl alcohol layer (12% of residual acetyl groups, K-value 4) such that a dry layer weight of 0.8 g/m$^2$ is obtained. As a result of the application of this oxygen barrier layer to the photocurable layer the photosensitivity is increased by 15%. When the print runs of the two plates are tested in a sheet-fed offset press it is found that the print run of the plate provided with the protective cover layer is increased by approximately 150% compared to the plate without the polyvinyl alcohol layer.

EXAMPLE 2

A coating solution is prepared from
1.00 pbw of polymer L,
1.00 pbw of the reaction product obtained from 1 mol of 2,4,4-trimethyl-hexamethylene diisocyanate and 2 mol of hydroxyethyl methacrylate,
0.10 pbw of 2,4-bis-trichlormethyl-6-(4-styrylphenyl)-s-triazine and
0.01 pbw of a blue azo dye obtained by coupling 2,4-dinitro-6-ohlorobenzenediazonium salt with 2-methoxy-5-acetylamino-N-cyanoethyl-N-hydroxyethylaniline, in
50.00 pbw of 2-methoxyethanol
and applied onto the support material specified in Example 1, such that a dry layer weight of 1.6 g/m$^2$ is obtained. The plate is exposed for 30 seconds through a continuous tone step wedge and a silver film of uniform optical density serving as a grey filter. Development is performed as in Example 1 with a solution comprising
5.0 pbw of sodium octyl sulfate,
1.0 pbw of sodium metasilicate×5 H$_2$O and
94.0 pbw of distilled water.
The plate can be readily developed and exhibits a solid step 4. Even the finest screen elements of the original are completely reproduced on the copy.

When polymer L is replaced by the same amount of polymer X and processing is carried out as described above, a printing plate likewise exhibiting a solid step 4 is obtained.

EXAMPLE 3

A solution is prepared from
1.00 pbw of polymer M,
1.00 pbw of a technical-grade mixture of pentaerythritol tri- and tetraacrylate,
0.15 pbw of 2-(p-trichloromethyl-benzoylmethylene)-3-ethyl-benzothiazoline and
0.03 pbw of the azo dye of Example 2, in
50.00 pbw of propylene glycol monomethyl ether
and applied to the support material described in Example 1 in a way such that a dry layer weight of 1.5 g/m$^2$ is obtained.

Thereafter an oxygen barrier layer as in Example 1, having a weight of 0.6 g/m$^2$, is applied. Exposure and development are performed as described in Example 2; an exposure time of 6 seconds is required for obtaining an image as in Example 2.

Following exposure, the printing plate is heated to 100° C. for one minute and then developed. Compared to the same plate without the thermal post-treatment, a solid step 5 is achieved. The print run can be extended by about 100% by the thermal post-treatment. The same increase can be accomplished by a post-exposure step.

EXAMPLE 4

A coating solution is prepared from
1.000 pbw of polymer N,
1.500 pbw of trimethylolethane triacrylate,
0.200 pbw of the triazine of Example 1, and
0.015 pbw of Crystal Violet (C.I. 42,555), in
50.000 pbw of propylene glycol monomethyl ether
and applied to the support material of Example 1. The dry layer weight is 1.3 g/m². The oxygen barrier layer is adjusted to a dry weight of 0.8 g/m². Exposure is performed for 20 seconds at a distance of 110 cm by means of a 5 kW metal halide lamp, under the exposure test wedge described in Example 1, onto which a silver film of uniform blackening (density 1.57) and uniform absorption over the effective spectral range is additionally mounted as a grey filter. Following exposure, the plate is developed with the developer of Example 1. The non-exposed layer areas are removed within a short time after being wetted with the developer liquid. The developed plate is rinsed with water and dried. Step 5 is completely reproduced on the copy. Even the finest screen dots and lines of the original are reproduced.

EXAMPLE 5

A coating solution comprised of
1.00 pbw of polymer O,
1.00 pbw of pentaerythritol triacrylate,
0.01 pbw of phenylazodiphenylamine,
0.10 pbw of 2,4-bis-trichloromethyl-6-(4-ethoxy-naphthyl)-s-triazine and
0.02 pbw of Victoria Pure Blue FGA (C.I. Basic Blue 81), in
50.00 pbw of propylene glycol monomethyl ether
is applied to the support material of Example 1, in a way such that a dry layer weight of 1.9 g/m² results. Then a protective cover layer as described in Example 1 is applied. The photosensitive layer is exposed through a standard negative original as described in Example 1 and developed with the developer solution of Example 1. The resulting printing form immediately accepts greasy ink in a sheet-fed offset press. Even after a prolonged press standstill only 2 to 8 sheets have to be printed to achieve good ink acceptance. 180,000 good prints can be run, and even the finest lines are completely reproduced.

EXAMPLE 6

A coating solution is prepared from
3.50 pbw of polymer P,
3.50 pbw of β-hydroxyethyl methacrylate,
0.80 pbw of hexanediol-1,6-dimethacrylate,
0.75 pbw of benzil dimethyl ketal and
0.10 pbw of Rhodamine B (C.I. 45,170), in
75.00 pbw of distilled water and
30.00 pbw of n-propanol
and coated onto the support described in Example 1, in a way such that a dry layer weight of 2.0 g/m² is obtained. The plate is exposed for 28 seconds through a standard negative original and then spray-developed with tap water. Even fine elements are accurately reproduced on the resulting printing plate. This proves that the exposed layer areas are neither washed out during development nor have a tendency to swelling.

EXAMPLE 7

A coating solution is prepared from
1.560 pbw of polymer L,
0.910 pbw of a diazonium salt polycondensation product prepared from 1 mole of 3-methoxydiphenylamine-4-diazonium sulfate and 1 mole of 4,4'-bis-methoxy-methyl-dihenylether, isolated as mesitylene sulfonate,
0.049 pbw of phosphoric acid (85% strength),
0.162 pbw of 2-(4-methoxystyryl)-4,6-bis-trichloromethyl-s-triazine,
1.750 pbw of a technical-grade mixture of pentaerythritol tri- and tetraacrylate and
0.550 pbw of the azo dye described in Example 2, in
77.000 pbw of 2-methoxyethanol
and applied to an aluminum foil which has been electrochemically grained, anodically oxidized and post-treated with polyvinylphosphonic acid. Application takes place such that a dry layer weight of 1.8 g/m² results.

The layer is exposed for 25 seconds through a negative original. Development is performed with a developer solution having the following composition:
5.0 pbw of sodium octyl sulfate,
1.5 pbw of sodium metasilicate × 5 H₂O,
1.5 pbw of trisodium phosphate × 12 H₂O,
0.5 pbw of disodium hydrogen phosphate × 12 H₂O, and
92.0 pbw of distilled water.

Step 4 of the exposure test wedge is completely cured on the printing plate. Compared to printing plates prepared with conventional binders (Comparative Example 2), the plate of the invention is distinguished by a very steep gradation.

The printing plate is clamped into a sheet-fed offset press where it readily accepts printing ink. 280,000 good prints can be run.

EXAMPLE 8

A coating solution is prepared from
2.50 pbw of polymer M,
5.60 pbw of a technical-grade mixture of pentaerythritol tri- and tetraacrylate,
0.20 pbw of the triazine specified in Example 7 and
0.03 pbw of the azo dye specified in Example 2, in
25.00 pbw of butanone,
2.00 pbw of ethanol and
1.00 pbw of butyl acetate
and spin-coated onto a 25 μm thick biaxially stretch-oriented and heat-set polyethylene terephthalate film, such that a layer weight of 35 g/m² results after drying at 100° C. The dry resist film prepared in this way is laminated at 120° C. onto a phenoplast laminate board clad with a 35 μm thick copper foil, employing a customary laminating device. Exposure is performed for 25 seconds using a customary exposure device. The original used is a line original having line widths and spacings down to 80 μm. Following exposure the polyester film is slowly peeled off, and the layer is developed for 90 seconds in a spray developing station, using the developer specified in Example 1.

After development, the plate is rinsed with tap water for 30 seconds, etched for 30 seconds in a 15% strength ammonium peroxydisulfate solution and then electroplated in the following electroplating baths:

1. for 30 minutes in a copper bath from Messrs. Schloetter, Geislingen/Steige, West Germany, type "Glanzkupfer-Bad" (Brilliant Copper Bath).
   current density: 2.5 A/cm$^2$
   metal build-up: about 12.5 $\mu$m
2. for 30 minutes in a nickel bath from the same manufacturers, type "Norma".
   current density: 4.0 A/cm$^2$
   metal build-up: 9.0 $\mu$m The plate does not exhibit any damage or undercutting. Decoating is performed at a temperature of 50 °C., using 5% strength KOH solution. The bared copper is etched away with customary etchants.

EXAMPLE 9

As described in Example 1, a coating solution is prepared from polymer Q and applied to the support material specified in Example 1 such that a dry layer weight of 2 g/m$^2$ is obtained. The photosensitive layer is exposed and developed as described in Example 1. Step 4 of the exposure test wedge is reproduced solid on the resulting printing plate. Even the finest screen elements and lines of the original are fully reproduced. When the plate is provided with an oxygen barrier layer as described in Example 1, an exposure time of 6 seconds is sufficient to obtain a solid step 4.

EXAMPLE 10

A coating solution is prepared from
2.30 pbw of polymer R,
0.35 pbw of Renol Blue B2GH (C.I 74,160),
0.21 pbw of the triazine specified in Example 7, and
0.01 pbw of phenylazodiphenylamine, in
70.00 pbw of propylene glycol monomethyl ether
and applied to the support material of Example 1, such that a dry layer weight of 1.46 g/m$^2$ is obtained. The photosensitive layer is exposed through a negative original for 50 seconds, heated to 100° C. for one minute and developed with the developer solution of Example 7. Even the finest line and screen elements are accurately reproduced on the copy.

Step 4 of the continuous tone step wedge is completely cured. The printing plate is distinguished by excellent printing properties.

EXAMPLE 11

A coating solution comprised of
2.60 pbw of polymer N,
1.30 pbw of the diazonium salt polycondensation product described in Example 7,
0.06 pbw of phosphoric acid (85% strength),
0.02 pbw of phenylazodiphenylamine and
0.35 pbw of Victoria Pure Blue FGA, in
80.00 pbw of 2-methoxymethanol
is applied to an aluminum foil pretreated as described in Example 1, such that the dried layer has a weight of 1.2 g/m$^2$. As described in Example 1, the layer is exposed for 20 seconds and developed. The non-exposed areas are completely removed within a short time. The developed plate is rinsed with water and dried. Even the finest lines and screen dots of the original are fully reproduced. When clamped into a sheet-fed offset press, the resulting printing plate gives more than 210,000 prints.

EXAMPLE 12

A coating solution is prepared as described in Example 10, with the exception that the polymer is replaced by 1.8 pbw of polymer N and 0.5 pbw of a methacrylic acid/hexyl methacrylate/styrene terpolymer (30:60:10 percent by weight). The solution is coated onto a support as described in Example 1, such that a dry layer weight of 1.64 g/m$^2$ is obtained. An oxygen barrier layer as in Example 1, having a dry weight of 0.8 g/m$^2$, is applied by spin coating. The plate is exposed for 20 seconds, post-heated at 100° C. for one minute and then developed with the developer solution of Example 1. The copying behavior is the same as that of the plate according to Example 10.

EXAMPLE 13

A coating solution is prepared from
6.20 pbw of polymer N,
2.10 pbw of the diazonium salt polycondensation product of Example 7,
0.30 pbw of Victoria Pure Blue FGA (C.I. Basic Blue 81)
0.24 pbw of phosphoric acid (85% strength),
0.24 pbw of 45% strength 2,5-dimethylhexane-2,5-di-tert.-butyl peroxide, as granules with chalk (INTEROX DHBP-45-IC/G made by Peroxid-Chemie GmbH) and
0.07 pbw of phenylazodiphenylamine, in
257.00 pbw of propylene glycol monomethyl ether and
93.00 pbw of methanol,
applied to an aluminum foil pretreated as described in Example 1, and dried. The resulting copying layer, which has a dry weight of 1.14 g/m$^2$, is exposed through a negative original for 25 seconds by means of a 5 kW metal halide lamp. The exposed layer is developed with the developer solution specified in Example 7, with the aid of a plush dabber and subsequently rinsed with water and dried. The non-exposed layer areas are completely removed by development within a few seconds. Step 4 of the silver film continuous tone step wedge described in Example 3 is solid on the copy.

The printing plate is stored in a circulating air drying cabinet at 200° C. for 5 minutes and then allowed to cool down. A printing test in a sheet fed offset press is stopped after 260,000 prints, although no loss in quality is stated.

EXAMPLE 14

Analogously to Example 1, a coating solution is prepared and processed, with the exception that polymer S, dissolved in 2-methoxy-ethanol, is employed. The photosensitive layer has a weight of 2.0 g/m$^2$ After an exposure time of 20 seconds an excellent image is obtained where step 4 of the continuous tone stepwedge is fully cured. The plate produced in this way is developed without scumming by spraying-on tap water. The exposure time can be reduced to 3 seconds by applying an oxygen barrier layer weighing 0.8 g/m$^2$. Here, too, fine elements of the original are exactly reproduced.

EXAMPLE 15

Analogously to Example 1, a coating solution is prepared and processed, with the exception that polymer T is used (dry layer weight 1.5 g/m$^2$). The resulting printing plate requires an exposure time of 22 seconds in order to present a solid step 4 on the continuous tone stepwedge. The printing properties of the plate are excellent. The exposure time is reduced to 7 seconds by the application of an oxygen barrier layer. In contrast to the plate according to Example 1, this plate can be developed with pure water.

EXAMPLE 16

Analogously to Example 1, a coating solution is prepared and processed, with the exception that polymer U is employed (layer weight 1.5 g/m²). The resulting printing plate is exposed for 25 seconds whereafter a fully cured step 4 is obtained on the continuous tone stepwedge. Development is performed with the solution specified in Example 1. The exposure time can be reduced to 10 seconds by the application of an oxygen barrier layer.

EXAMPLE 17

Analogously to Example 1, a coating solution is prepared and processed, with the exception that polymer V is employed (layer weight 1.7 g/m²). The resulting printing plate is exposed for 25 seconds whereafter a fully cured step 4 is obtained on the continuous tone stepwedge. Development is performed with the solution specified in Example 2. The exposure time can be reduced to 15 seconds by the application of an oxygen barrier layer.

COMPARATIVE EXAMPLE 1

Following the procedure described for polymer M, polymer E is acetalized with n-butyraldehyde. Using the resulting polymer, a coating solution and a printing plate are prepared as described in Example 1. Compared to the plate described in Example 1, which contains a binder according to this invention with photopolymerizable double bonds, the photosensitivity of the resulting plate without an oxygen barrier layer is reduced by 40%. When an oxygen barrier layer is applied, the exposure time required for the comparative plate is 7 times higher than the exposure time required for the plate according to Example 1.

Moreover, the binders of this invention result in a very steep gradation compared to mixtures prepared with saturated binders.

COMPARATIVE EXAMPLE 2

Analogously to Example 7, a coating solution is prepared and processed, which contains 1.56 pbw of reaction product obtained from 50 pbw of a commercially available polyvinyl butyral having a molecular weight of about 70,000 to 80,000 and comprising 71% of vinyl butyral units, 2% of vinyl acetate units and 27% of vinyl alcohol units, and 4 pbw of maleic anhydride having an acid number of 30. To achieve the same result as in Example 7, an exposure time of 35 seconds is necessary. Development is performed with the same solution as in Example 7. Under these conditions, flakes of the photosensitive layer containing the comparative polymer as binder are dissolved from the support, despite the carboxyl groups contained in the binder. This shows that the developability of the plates is very favorably influenced by the ether groups contained in the graft polymers according to this invention. The resulting comparative plate exhibits a flat gradation. Following the last solid step, three ghost steps remain on the plate, whereas only one ghost step is left behind following development of the plate according to Example 7.

COMPARATIVE EXAMPLE 3

Analogously to Example 6, double bonds are introduced into a commercially available polyvinyl alcohol having a content of residual acetyl groups of about 1.5% and a viscosity of 4 mPa.s (4% strength aqueous solution, measured at 20° C.). The polymer is processed in a coating solution according to Example 6, in the same amount as the polymer of Example 6. The resulting plates differs from the plate according Example 6 in some essential aspects. For example, the ink acceptance of the comparative plate is clearly worse. Fine screens are reproduced less exactly than in Example 6, and the photosensitivity is lower.

COMPARATIVE EXAMPLE 4

A binder is prepared analogously to polymer O. The starting polymer is a commercially available polyvinyl alcohol having a content of residual acetyl groups of 12% and a viscosity of 8 mPa.s (4% strength aqueous solution, determined at 20° C. The polymer contains 3.5% by weight of C=C groups.

The polymer is employed to prepare a coating solution as described in Example 5. Compared to the plate of Example 5, the plate of this Comparative Example exhibits some disadvantageous properties. For example, the polymer crystallizes on the aluminum support and the plate has a very flat gradation, especially after the application of an oxygen barrier layer.

COMPARATIVE EXAMPLE 5

The binder of Comparative Example 1 is used in the mixture according to Example 3. A comparison of the plate obtained in this Comparative Example and the plate of Example 3 shows that both the photosensitivity and the gradation of a plate can be favorably influenced by introducing double bonds into the polymer.

COMPARATIVE EXAMPLE 6

As described for polymer K, a binder is prepared from the polyvinyl alcohol used in Comparative Example 3 and worked into the mixture of Example 1. A comparison of the two plates illustrates the difference between customary polyvinyl alcohols with double bonds and the graft polymer with double bonds according to this invention. The plate prepared with the binder based on customary polyvinyl alcohol cannot be developed with the developer solution of Example 1.

What is claimed is:

1. A graft polymer comprising a polyurethane as the graft backbone and a plurality of grafted-on chains which comprise units of vinyl alcohol and units having polymerizable or crosslinkable double bonds that are lateral to the grafted-on chain.

2. A graft polymer as claimed in claim 1, wherein the units with lateral polymerizable or crosslinkable double bonds comprise vinyl ester units, vinyl ether units or vinyl urethane units.

3. A graft polymer as claimed in claim 1, wherein the grafted-on chains further comprise saturated vinyl ester units.

4. A graft polymer as claimed in claim 1, wherein the grafted-on chains further comprise saturated vinyl acetal units.

5. A graft polymer as claimed in claim 4, wherein the vinyl acetal units are derived from an aliphatic or cycloaliphatic aldehyde.

6. A graft polymer as claimed in claim 1, wherein the grafted-on chains further comprise units of other ethylenically unsaturated monomers which are copolymerizable with vinyl esters.

7. A graft polymer as claimed in claim 1, wherein the polyurethane comprises a polyaddition product of diisocyanate units and diol units.

8. A graft polymer as claimed in claim 1, wherein the polyurethane has a molecular weight between about 200 and 100,000.

9. A graft polymer as claimed in claim 1, wherein the units with lateral polymerizable or crosslinkable double bonds comprise acryloyl radicals or methacryloyl radicals.

10. A graft polymer as claimed in claim 1 comprising
from about 0 to 45 mole % of vinyl ester units,
from about 0 to 97 mole % of vinyl alcohol units,
from about 0 to 85 mole % of vinyl acetal units and
from about 1 to 60 mole % of units with lateral polymerizable or crosslinkable double bonds,
relative to the mole number of the grafted-on units.

11. A photocurable mixture comprising (a) a graft polymer as claimed in claim 1 and (b) at least one negative-working photosensitive compound.

12. A photocurable mixture as claimed in claim 11, wherein component (b) comprises a photoinitiator compound or combination of compounds, which upon irradiation with actinic light is capable of initiating the polymerization or crosslinking of the ethylenically unsaturated lateral chains.

13. A photocurable mixture as claimed in claim 12, further comprising (c) a low molecular-weight, ethylenically unsaturated, free-radically polymerizable compound.

14. A photocurable mixture as claimed in claim 13, comprising from about 20 to 90% by weight of graft polymer (a), about 0.05 to 20% by weight of photoinitiator component (b) and about 0 to 80% by weight of low molecular-weight, polymerizable compound (c).

15. A photocurable mixture as claimed in claim 11, wherein component (b) comprises a diazonium salt polycondensation product.

16. A photocurable recording material comprising a layer support and a photosensitive recording layer, wherein said layer comprises a mixture as claimed in claim 11.

17. A photocurable mixture as claimed in claim 11, wherein component (b) is a diazo compound.

18. A photocurable mixture as claimed in claim 11, wherein component (b) is an azido compound.

* * * * *